Nov. 6, 1951   M. L. BLAIR ET AL   2,574,011
CHAFF SCREEN
Filed Dec. 29, 1945   3 Sheets-Sheet 1
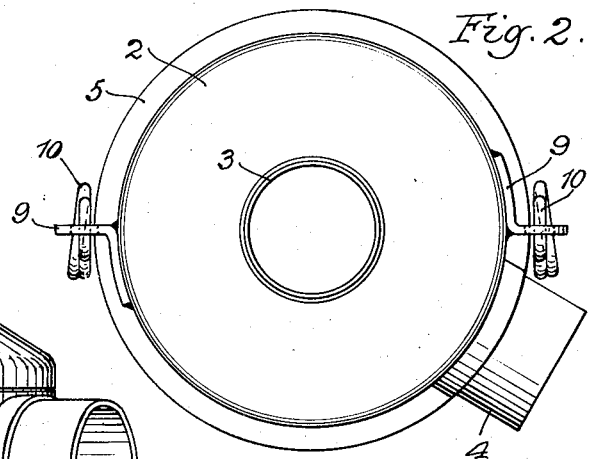
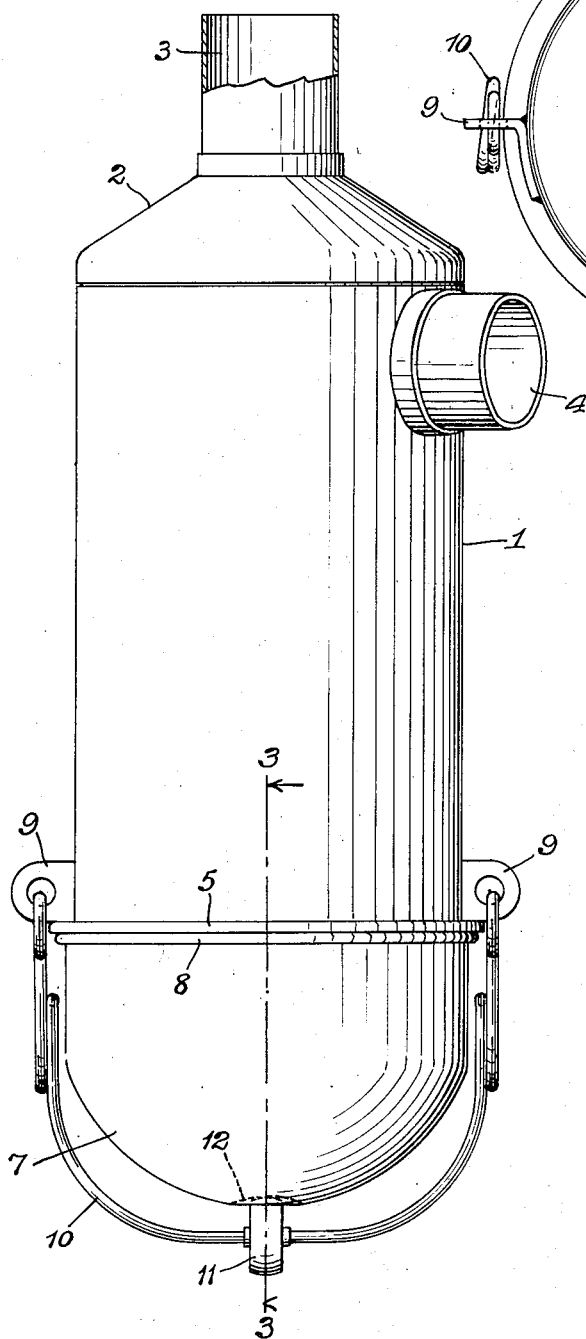
Inventors
Alexander J. McAllister
Mark L. Blair
by Parker & Carter
Attorneys Nov. 6, 1951 — M. L. BLAIR ET AL — 2,574,011
CHAFF SCREEN
Filed Dec. 29, 1945 — 3 Sheets-Sheet 2

Inventors
Alexander J. McAllister
Mark L. Blair
by Parker & Carter
Attorneys.

Nov. 6, 1951 M. L. BLAIR ET AL 2,574,011
CHAFF SCREEN
Filed Dec. 29, 1945 3 Sheets-Sheet 3

Inventors.
Alexander J. McAllister
Mark L. Blair
by Parker + Carter
Attorneys

Patented Nov. 6, 1951

2,574,011

UNITED STATES PATENT OFFICE 2,574,011

CHAFF SCREEN

Mark L. Blair, Flossmoor, and Alexander J. McAllister, Chicago, Ill., assignors to United Specialties Company, Chicago, Ill., a corporation of Delaware Application December 29, 1945, Serial No. 638,329

2 Claims. (Cl. 183—15)

This invention relates to an air cleaner and particularly to a removable unitary screen assembly for use with an oil bath or other air cleaner.

One object is to provide a removable and readily cleanable screen unit which can be freely associated with an air cleaner.

Another object is to provide a screen of the type mentioned which will receive and retain the larger impurities such as chaff, thereby reducing the burden upon the remaining filtering means in the filter assembly.

Other objects will appear from time to time in the course of the specification and claims.

The invention is illustrated more or less diagrammatically in the accompanying drawings, wherein:

Figure 1 is a side elevation of one form of cleaner in which the invention may be mounted;

Figure 2 is a plan view of the cleaner;

Like parts are indicated by like symbols throughout the specification and drawings.

Figure 3:
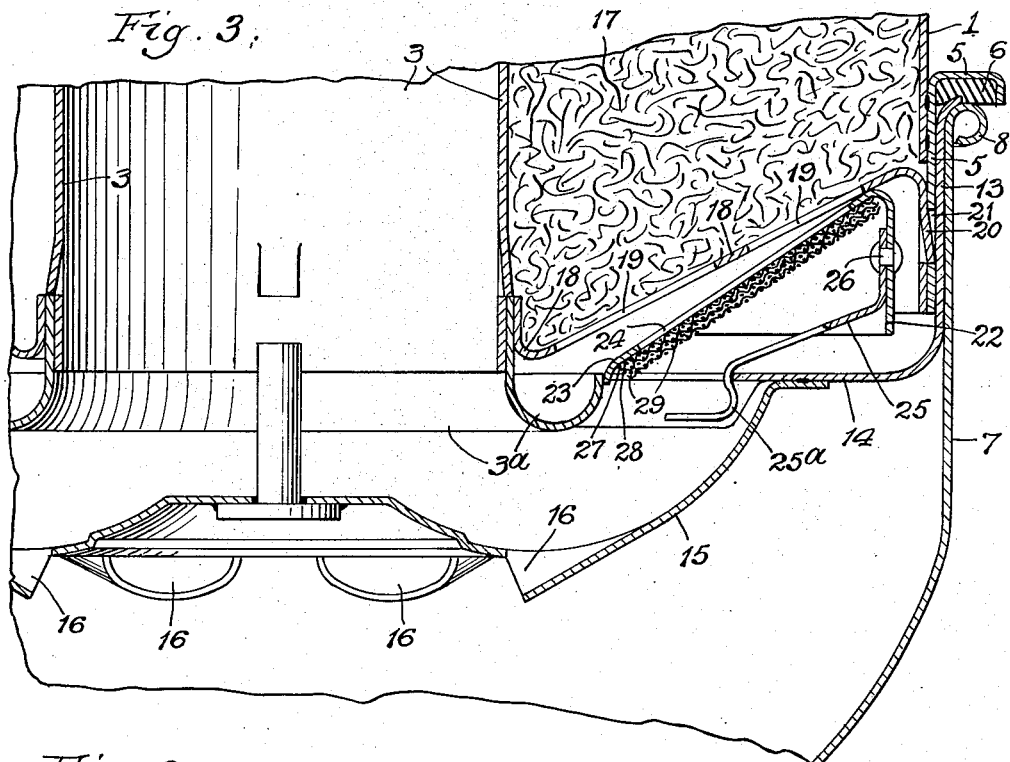
Figure 3 is a vertical section taken on an enlarged scale at line 3—3 of Figure 1.

The invention is illustrated in connection with an oil bath cleaner of the so-called "center tube" type in which air enters through a center tube, passes downwardly to an oil chamber and passes upwardly thence through filtering means and outwardly. The cleaner includes an outer housing 1 which may have a top or closure member 2 to which an inlet pipe 3 is connected. The inlet pipe may receive air from any source. It terminates, at its lower end, in a baffle portion 3a. After moving downwardly through the cleaner the air moves upwardly through the cleaner and is discharged through an outlet pipe 4. The cleaner housing 1 is provided with an annular member 5, and this member is provided with a gasket 6 for sealing purposes.

Figure 5:
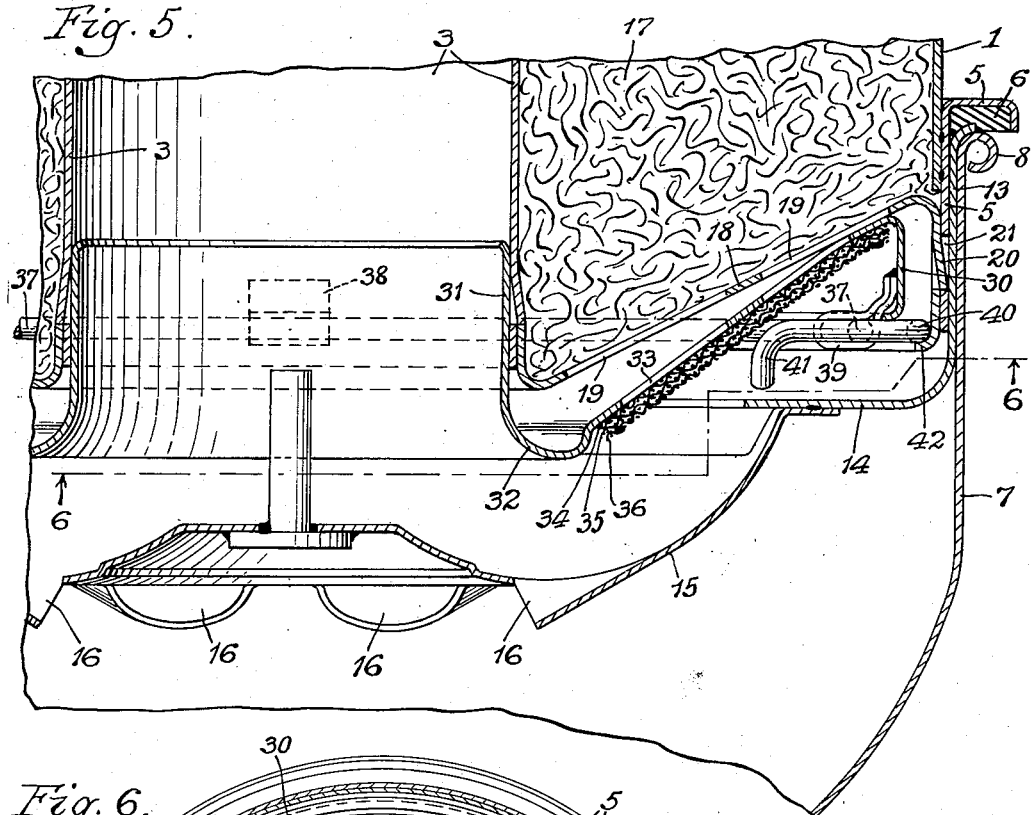
Figure 5 is a sectional view similar to Figure 3 showing a modified form.

Seated against the gasket and overlapping the lower portion of the housing 1 is an oil cup 7. This cup may have its upper edge downwardly turned or curved, as at 8, and this edge is seated against the gasket 6, as shown in Figures 3 and 5. The cup is of sufficient size to contain the desired quantity of cleaning liquid, such as oil.

The member 1 is provided with means for retaining the cup. In the particular form here shown, these means include ears 9 in which a spring bail 10 is mounted for swinging movement. The bail may have a rotary member 11 which reduces friction when the bail is moved into and out of place. The cup 7 may be provided with a depression 12 to receive and seat the member 11.

Within the housing and lying mainly within the cup 7 may be a baffle. As shown the baffle includes an annular supporting member 13 which is integral with a relatively flat member 14. This member projects inwardly from the wall of the cup 7. Secured to the member 14 is a baffle 15 shaped to provide one or more openings 16.

Only so much of the details of the cleaner are described as is necessary for an understanding of the use of the mechanism of the invention.

Positioned between the center inlet tube 3 and the housing member 1 is a mass of filtering material 17. This material may be metal wool or any form of material which is generally analogous. Animal fibers are also useable as well as synthetic fibers. The filter mass is held in place by a retaining member 18 which is provided with sufficient structural members to strengthen it and is provided with many openings 19 to permit relatively free passage of air or gas through it. The member 18 may be held in place by any desired means. As shown it is provided with one or more spring lugs 20 which fit into openings or notches 21 in the member 5 which is itself secured to the housing section 1.

Figure 4:
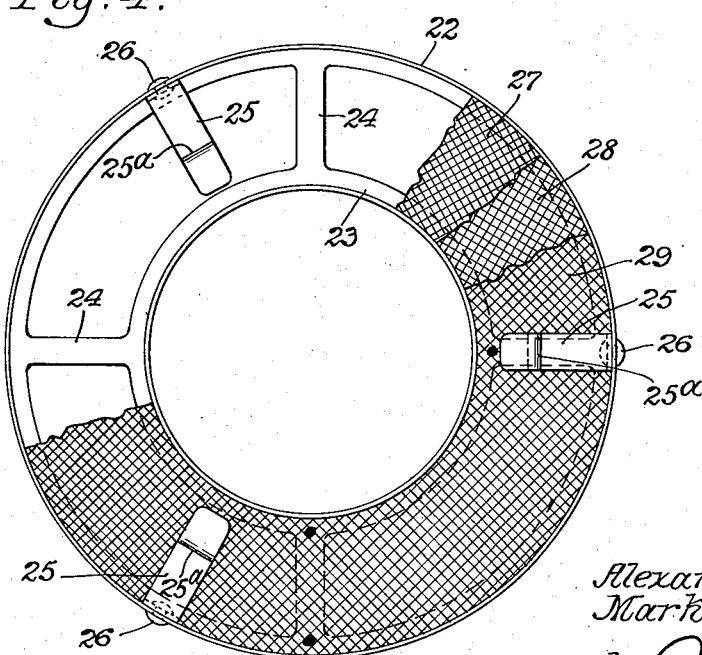
Figure 4 is a view of the screen assembly taken from its lower or under side.

The parts thus far described comprise an oil bath air cleaner of the type now generally known and available at present. The screen of the present invention comprises a structural and supporting member which includes an annular portion 22 which preferably is integral with a central smaller annular portion 23. These parts are connected by arms or transverse members 24. As shown particularly in Figure 4 the space between the members 22 and 23 is substantially open. One or more spring arms 25 may be secured to the member 22 by rivets 26 or otherwise. As shown each spring arm is provided with a nose 25a which when the device is in place engages the inner edge of the member 14 as shown particularly in Figure 3. The member 23 is in contact with some parts of the inlet or baffle system. As shown in Figure 3 it is in contact with a baffle member 3a which forms a part of or is attached to the lower end of the inlet tube 3. One or more layers of screening are mounted on and supported by the members 22 and 23. As shown in Figures 3 and 4 there are three such layers of screening. The uppermost being number 27, the next being number 28 and the lowermost being number 29. As shown in Figure 4 these layers of screening may comprise wire mesh or other mesh material and they are preferably arranged so that the meshes of adjacent layers are not in register with each other. In this manner the screen is rendered somewhat less pervious to foreign matter than would be the case if the meshes of adjacent layers were properly registered and matched.

Figure 6:
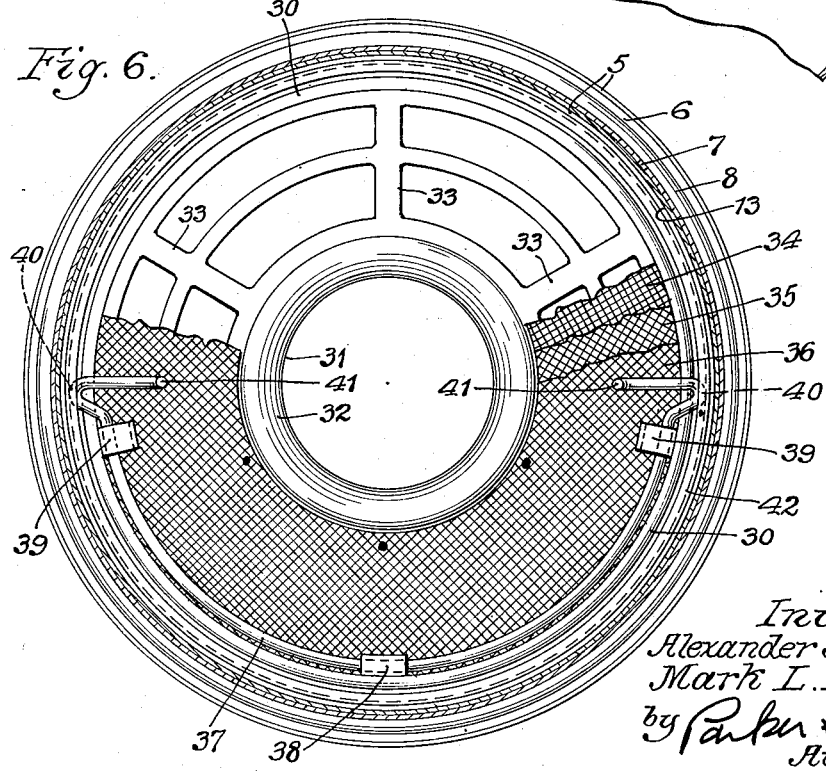
Figure 6 is a view similar to Figure 4, showing the under side of the modified form of Figure 5, and a section of the entire device taken at line 6—6 of Figure 5.

In the modified form of the device as shown in Figures 5 and 6 the parts are analogous to the parts just described but the attaching means are somewhat different. As shown the removable screen assembly of Figures 5 and 6 comprises an outer relatively annular member 30 and an inner annular member 31 which may be provided with a baffle portion 32. The members are connected by arms or cross pieces 33. These pieces are relatively slender in order to provide a minimum of interruption to the passage of air through the screens. As in the case of the form of Figures 3 and 4 three layers of screen are preferably provided the uppermost being numbered 34 and intermediate layer being numbered 35 and a lower layer numbered 36. These layers are preferably arranged with their meshes out of register as described above.

While many means may be provided for holding the screens of Figures 5 and 6 in place the one shown is suitable and it comprises a spring rod or wire 37 which extends about a portion of the periphery of the member 30. The member 37 is held in place on the member 30 by a loop like portion 38 which fits relatively tightly about it and by two loop portions 39, 39 in which the member 37 fits loosely. The member 37 is bent or otherwise shaped to provide a pair of noses 40 and inwardly and preferably downwardly bent handle portions or operating portions 41, 41. As shown in Figure 5 particularly the spring member 37 when free to do so moves the noses 40 into engagement with the ledge like portion 42 of the member 18.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

When the device is to be used the removable screen assembly in either form is put in position in an air cleaner. It does not constitute the main filtering member or mass and it will be associated in a cleaner with another filter mass which will ordinarily be relatively permanent as shown herewith. Experience has shown that the larger dust particles or foreign matter tend to accumulate at the bottom or at the lower portion of the filter mass and these are difficult to remove. When the removable screen of the present invention is positioned below and adjacent the lower end of the filter mass the air or other gases passing upwardly through the cleaner will contact the removable screen first and the larger particles of foreign matter will be caught upon and retained by this removable screen.

In the normal operation of an oil bath cleaner liquid such as oil is carried constantly upwardly during the operation of the engine to which the cleaner is attached, and also moves downwardly more or less constantly. Thus the entire screen assembly or at least a major part of it is wetted with circulating liquid. A substantial part of the foreign matter which is removed from the moving stream of gas will be carried downwardly and washed off of the filter mass by the returning or downwardly flowing liquid. Some, however, will be retained and experience has shown that the major part of the foreign matter will be retained by the removable screen assembly. From time to time thereafter the cleaner is taken apart by the removal of the oil cup which carries with the main baffle assembly. The removable screen assembly is then readily available and is removed and washed or otherwise cleaned. After cleaning it is replaced and the cleaner may be reassembled for further use. This operation may of course be repeated as often as cleaning is necessary. The need for cleaning will vary with the use to which the cleaner is put, with the time in operation and with the type of country in which it is used.

Obviously in dusty country or in a dusty atmosphere of any sort cleaning is required more frequently than would otherwise be the case.

We claim:

1. In combination in an air cleaner, a housing and an inlet tube positioned centrally within said housing, said tube and said housing defining between themselves a filter space, a quantity of filter material positioned in said space, and a primary filter assembly comprising a plurality of downwardly and inwardly inclined conical, woven mesh members and a generally conical support therefor, said mesh members being permanently secured to said support with their meshes mismatched, said support including an upwardly directed tubular section adapted to extend into the lower end of said inlet tube and including also an annular baffle portion positioned between the lower end of the tubular section and the lower end of the conical support for directing air flowing from said inlet tube onto said mesh members.

2. In combination in an air cleaner, a housing and an inlet tube positioned centrally within said housing, said tube and said housing defining between themselves a filter space, a quantity of filter material positioned in said space, and a primary filter assembly comprising a plurality of downwardly and inwardly inclined conical, woven mesh members and a generally conical support therefor, said mesh members being permanently secured to said support with their meshes mismatched, said support including a centrally disposed, upwardly directed tubular section adapted to extend into the lower end of said inlet tube and including also an annular baffle portion positioned between the lower end of the tubular section and the lower end of said conical support for directing air flowing from said inlet tube onto said mesh members, said mesh material being positioned generally in line with the outer marginal edge portion of said baffle portion.

MARK L. BLAIR.
ALEXANDER J. McALLISTER.

REFERENCES CITED

The following references are of record in the file of this patent:

UNITED STATES PATENTS

| Number | Name | Date |
|---|---|---|
| 1,213,999 | Balzer | Jan. 30, 1917 |
| 1,876,368 | Walton | Sept. 6, 1932 |
| 2,037,164 | Harrah | Apr. 14, 1936 |
| 2,046,093 | Schaaf et al. | June 30, 1936 |
| 2,083,649 | Heglar | June 15, 1937 |
| 2,387,278 | Lowther | Oct. 23, 1945 |
| 2,397,525 | Bennett | Apr. 2, 1945 |